(12) United States Patent
Lee (10) Patent No.: US 11,223,189 B2
(45) Date of Patent: Jan. 11, 2022

(54) PRESS FIT JUNCTION RECEPTACLE

(71) Applicant: Dwight Ken Lee, Dayton, OH (US)

(72) Inventor: Dwight Ken Lee, Dayton, OH (US)

( * ) Notice: Subject to any disclaimer, the term of this patent is extended or adjusted under 35 U.S.C. 154(b) by 0 days.

(21) Appl. No.: 17/032,628

(22) Filed: Sep. 25, 2020

(65) Prior Publication Data

US 2021/0296870 A1 Sep. 23, 2021

Related U.S. Application Data

(60) Provisional application No. 62/991,365, filed on Mar. 18, 2020.

(51) Int. Cl.
*H02G 3/08* (2006.01)
*H02G 3/12* (2006.01)

(52) U.S. Cl.
CPC ............... *H02G 3/081* (2013.01); *H02G 3/12* (2013.01)

(58) Field of Classification Search
CPC ............ H02G 3/081; H02G 3/08; H02G 3/12; H02G 3/121; H02G 3/123; H05K 5/00; H05K 5/02; H05K 5/0204
USPC ........ 174/480, 481, 50, 53, 57, 58; 220/3.2–3.9, 4.02; 248/906
See application file for complete search history.

(56) References Cited

U.S. PATENT DOCUMENTS

| | | | | | |
|---|---|---|---|---|---|
| 2,769,562 | A | * | 11/1956 | Rudolph | H02G 3/123 220/3.4 |
| 2,842,281 | A | * | 7/1958 | Chisholm | H02G 3/123 220/3.6 |
| 2,870,931 | A | * | 1/1959 | Buckels | H02G 3/123 220/3.6 |
| 3,659,037 | A | * | 4/1972 | MacDonald | H02G 3/123 174/58 |
| 3,710,972 | A | * | 1/1973 | Barry | H02G 3/123 220/3.6 |
| 3,848,764 | A | * | 11/1974 | Salg | H02G 3/123 220/3.6 |
| 3,884,441 | A | * | 5/1975 | Barry | H02G 3/123 248/542 |
| 3,891,113 | A | * | 6/1975 | Salg | H02G 3/123 220/3.6 |
| 4,063,660 | A | * | 12/1977 | Ware | H02G 3/123 220/3.6 |
| 4,215,787 | A | * | 8/1980 | Moran, Jr. | H02G 3/123 174/54 |
| 4,794,207 | A | * | 12/1988 | Norberg | H02G 3/125 174/505 |

(Continued)

*Primary Examiner* — Angel R Estrada
(74) *Attorney, Agent, or Firm* — R. William Graham (57) ABSTRACT

An improved junction receptacle press fits to a surrounding drywall, or other sheet material, has at least one side wall and back wall defining front opening, and at least one flange extending laterally from the side wall adjacent a font edge of the side wall. At least one pivotal wing is formed in the sidewall having a forward end which can be biased outward from the side wall and spaced from the flange about a distance equal to a thickness of the drywall. The wing has a rear end substantially continuous with the side wall surface to permit the insertion of the junction box into a cutout of drywall surface slightly larger than the sidewall dimension and when so inserted compresses the wing inward where upon the forward end passing through the cutout can bias back to lock the junction box in place with the drywall between the flange and wing.

10 Claims, 6 Drawing Sheets

(56) References Cited

U.S. PATENT DOCUMENTS

| | | | |
|---|---|---|---|
| 5,726,392 A * | 3/1998 | Farr | H02G 3/16 174/153 G |
| 6,265,670 B1 * | 7/2001 | Duesterhoeft | H02G 3/083 174/152 G |
| 7,495,171 B2 * | 2/2009 | Gorin | H02G 3/085 174/66 |
| 2017/0005460 A1 | 1/2017 | Lee | |

* cited by examiner

PRESS FIT JUNCTION RECEPTACLE

FIELD OF INVENTION

This invention relates to junction boxes and housings used in residential and commercial construction to enclose electrical wiring and recessed light fixtures against fire and electrical hazards.

BACKGROUND

Construction codes require that electrical wiring, be contained in fire resistant protective conduit or coating and remain exposed to access. Two or more electrical wires can be connected in order to join the interior electrical conductors to each other. The joined wires are bridged within a junction box which provides continuity of enclosure between multiple wire conduits. The ends of metal conduits are joined to the walls of the junction box while electrical wires in the conduits enter through openings in the box walls into the junction box where the wires may be interconnected with each other, e.g. with electrical nut fasteners. In the event of an electrical overload, short circuit or similar anomalous condition which causes overheating or sparking, a fire resistant junction box contains and prevents ignition of nearby flammable materials. Construction codes typically require that junction boxes meet a minimum standard of protection, e.g. two hours of protection at a given exterior temperature.

In new construction, junction receptacles (boxes) are easily fastened to the rigid building frame, such as ceiling joists or wall studs, before drywall or other wall and ceiling material is installed. After the electrical connections are made, the wall or ceiling is then installed over the junction box, with holes cut in the ceiling or wall material for access to the boxes before being fixed into place.

In remodel construction requiring installation of junction boxes, it is difficult to access the building frame without removing the wall or ceiling surface first, i.e. tearing off dry wall sheet and the like. This is a labor intensive and expensive process.

There is a need for an improved category of junction boxes specifically made for remodel construction that do not require the removal of wall and ceiling to install. These require a hole to be cut in the existing wall or ceiling surface, electrical connections to be made, and then the junction box is installed through the hole from the outside. This junction box ideally would attach the box to the surface, e.g. dry wall sheet, instead of to the building frame.

It is the aim of the instant invention to improve the art by providing the junction boxes which can be used in remodel applications. The invention overcomes other deficiencies in the art.

A continuing need exists for an improved drywall retrofit junction box.

SUMMARY OF THE INVENTION

An object of the invention is to provide an improved electrical junction box housing which is easier to install in remodel or retrofit work.

Accordingly, the improved junction receptacle press fits to a surrounding drywall, or other sheet material, in a substantially fire resistant manner to provide a continuous protective partition between the interior of the junction receptacle and the space behind the dry wall and permits installation and servicing of wiring therein.

The clamping junction receptacle has at least one side wall and back wall defining front opening, and at least one flange extending laterally from the side wall adjacent a font edge of the side wall. At least one pivotal wing is formed in the sidewall having a forward end normally biased outward from the side wall and spaced from the flange about a distance equal to a thickness of the drywall.

The wing has a rear end substantially continuous with the side wall surface to permit the insertion of the junction box into a cutout of drywall surface slightly larger than the sidewall dimension and when so inserted compresses the wing inward where upon the forward end passing through the cutout can be biased back to lock the junction box in place with the drywall between the flange and the wing.

It is envisioned that the wing moves inwardly through an opening in the sidewall which is slightly larger than a size of the wing. The wing can be configured with a pull surface, such as a tab, which can be accessed through front opening to gain purchase thereon and draw the wing inward in order to remove the junction receptacle from the drywall should there be a need to do so.

The flange can include one or more notch on an inwardly disposed surface. This can be used with a cover plate having a complementary formed slotted surface edge to fit onto the junction receptacle.

The junction box can include knock out portions in one or more wall as is known in the art. Additionally, the junction box can be formed with screw receiving surface openings in the sidewall for receiving screws of a conventional electrical outlet device.

These and other improvements, features and advantages of this invention will be better understood by reference to the following detailed description of the preferred embodiments taken in conjunction with the accompanying drawings.

Other features will be apparent from reading the detailed description which follows in conjunction with the drawings.

DETAILED DESCRIPTION OF THE PREFERRED EMBODIMENT

Figure 1:
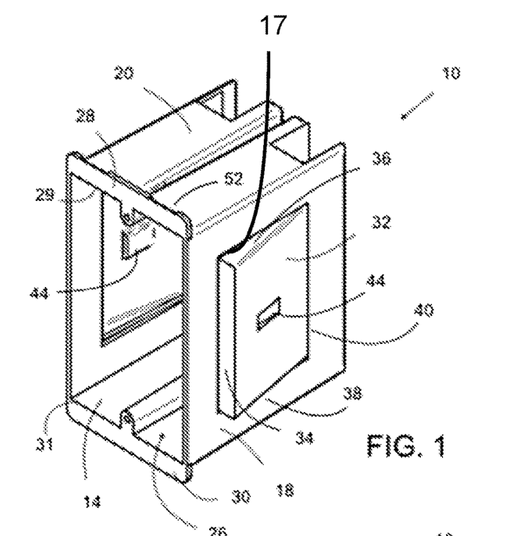
FIG. 1 is a perspective view of a first embodiment of junction box according to this invention, shown with the locking wings biased outward.
Figure 5:
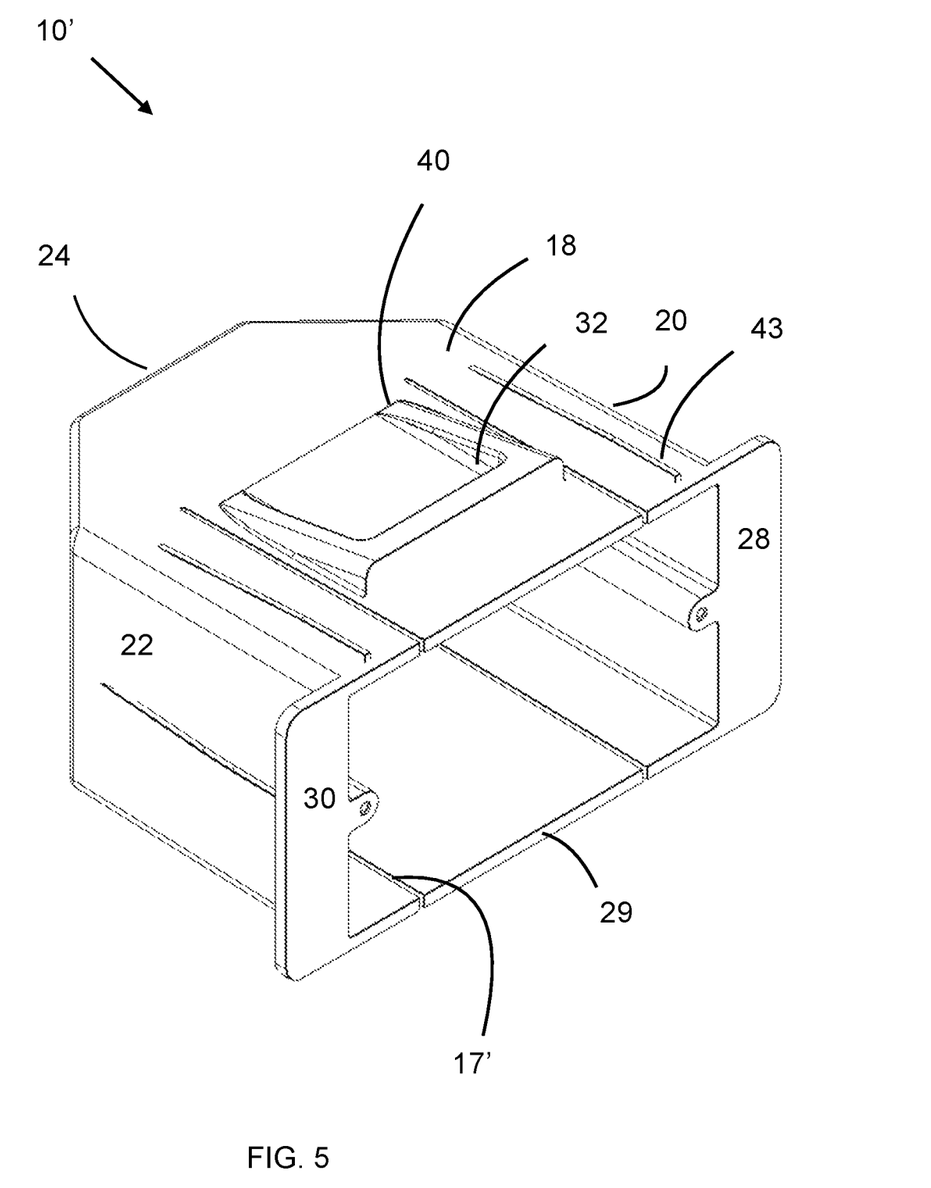
FIG. 5 is a perspective view of a second embodiment of junction box according to this invention, shown with the locking wings biased outward.

Referring to the accompanying drawings wherein like elements are designated by like numerals, FIG. 1 and FIG.

5 shows a preferred embodiments of a press fit wall junction receptacle or box generally designated by numerals 10, 10'. In the shown embodiments, the junction receptacle 10, 10' press fits to a surrounding wall material 12, e.g., drywall, or other sheet material 12, in a substantially fire resistant joint to provide a continuous protective partition between the interior 14 of the junction receptacle and the space 16 behind the dry wall 12 and permits installation and servicing of wiring therein.

The junction receptacle 10, 10' has at least one side wall 18 (here shown with two), a top wall 20 and bottom wall 22 and back wall 24 defining front opening 26. In embodiment 10', there are interconnecting pitched portions 23 and 25. A pair of flanges 28 and 30 extend laterally from respective top wall 20 and bottom wall 22 adjacent a font edge 29 and 31 of the wall 28 and 30, respectively.

A pair of pivotal wings 32 are formed in open surface 17 of each side wall 18 having a forward end 34, here seen enclosed, though need not be, and normally biased outward from the side wall 18 and spaced from the flange 28 and 30 about a distance equal to a thickness T of the drywall 12. In junction receptacle 10' the sides 18 have slotted surface 17' which extend to the front of the receptacle 10'. The wings 32 can be formed with top wall portion 36 and bottom wall portion 38. A rear end 40 of wings 32 can be hinged, for example, a living hinge in the case of a molded plastic part, or spring steel. The wing rear end 40 can be substantially continuous with the side wall 18 surface to permit the insertion of the junction box 10 into a cutout 42 of drywall 12 which is slightly larger than the side walls 18, top wall 20 and bottom was 22 dimensions. When so inserted compresses the wing inward where upon the forward end passing through the cutout preferably springs back (or can be biased back) to lock or clamp the junction box in place. Note, raised ribs 43 can be formed about the receptacle 10' or 10 to aid in press fitting the same.

In embodiment 10, each wing 32 can be configured with a pull surface 44, such as a tab, which can be accessed through front opening 26 to gain purchase thereon and draw the wing 32 inward in order to remove the junction receptacle 10 from the drywall 12 should there be a need to do so. Note, in embodiment 10' the user can simply pull inwardly disposed edges 29.

In embodiment 10, a number of knockout openings 46 (which can be pressed open in a manner to permit wire thereby, i.e., fingers) are provided in walls 18, 20 and 22, which may be individually opened as needed to receive electrical conduit and admit electrical conductors into receptacle box 10. In embodiment 10', there are a cross slits 47 formed in pitched portions 23 and 25 which permit the insertion of electrical wire and also serve to retain the wire from backing out once inserted by virtue of the cross slits 47 forming a plurality of retention fingers 49. The junction receptacle box 10, 10' can be formed with screw receiving surface openings 48 and 50 in top wall 20 and bottom wall, respectively, for receiving a conventional electrical outlet device.

Figure 2:
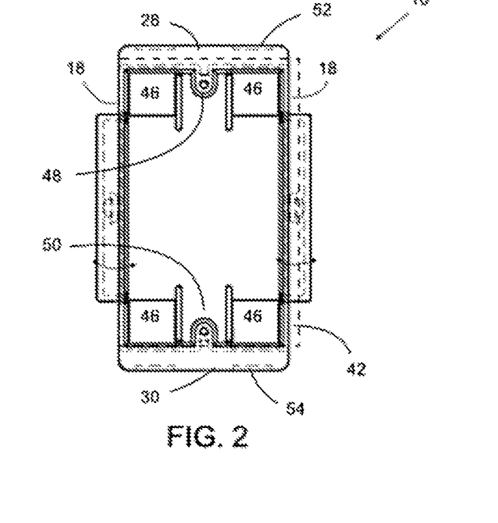
FIG. 2 is a front view of the invention in FIG. 1.
Figure 3:
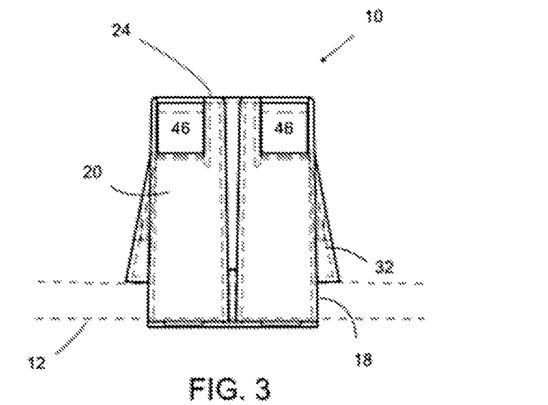
FIG. 3 is a top (and bottom) view of the junction box of FIG. 1 showing the wings released to an extended position, with clamping or press fit engagement with a sheet of wall material.
Figure 4:
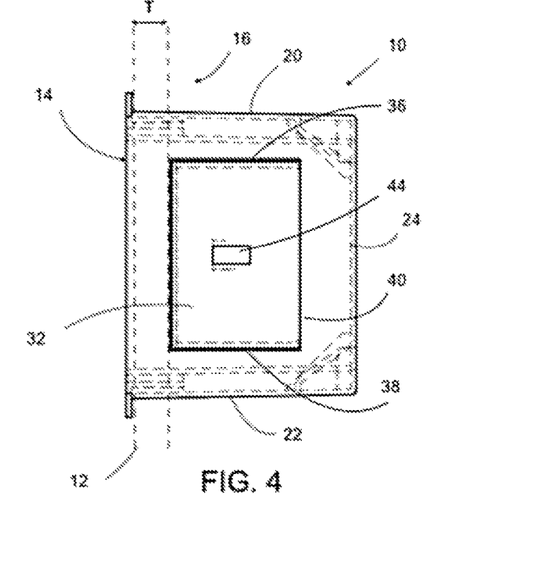
FIG. 4 shows a right side view (which is a mirror of left side view) of a junction box of FIG. 1 showing the wings released to an extended position, with clamping or press fit engagement with a sheet of dry wall.
Figure 6:
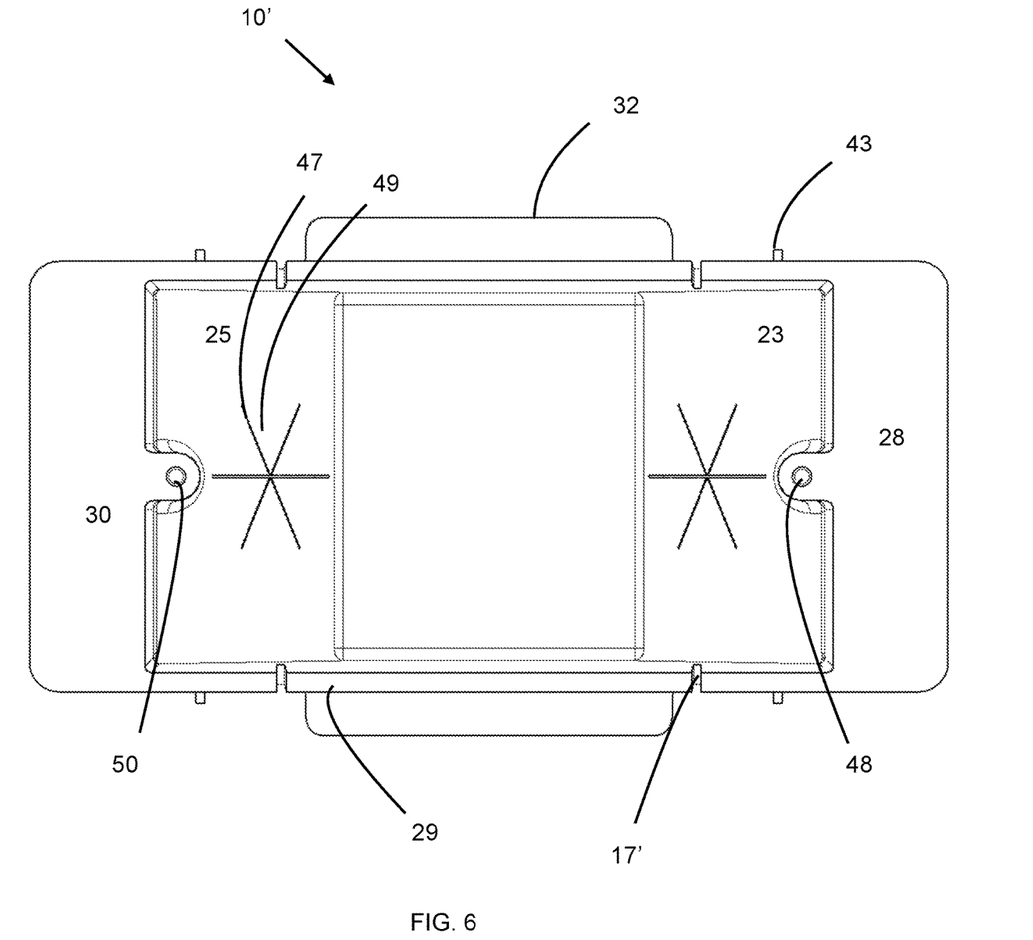
FIG. 6 is a front view of the invention in FIG. 5.
Figure 7:
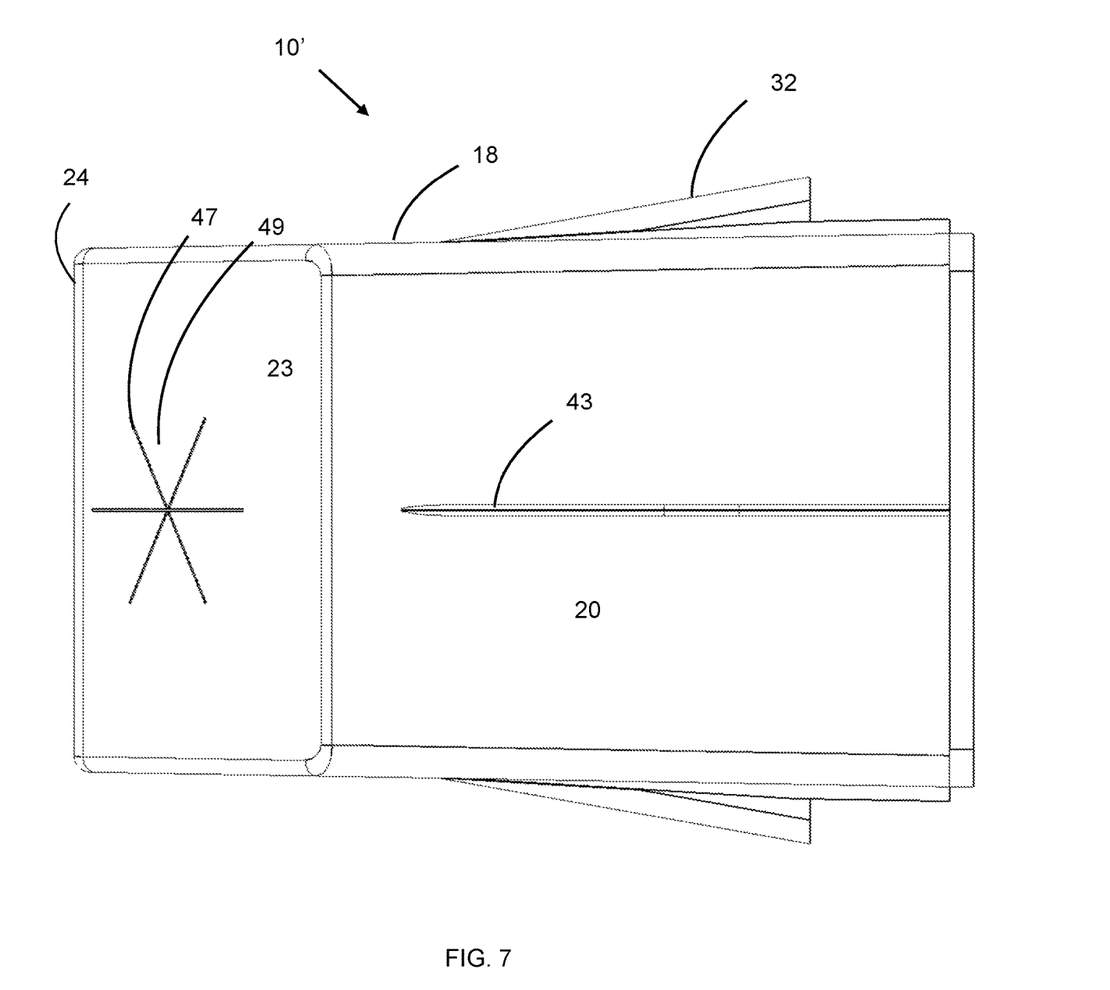
FIG. 7 is a top view (which is identical to bottom side view) of the junction box of FIG. 5.
Figure 8:
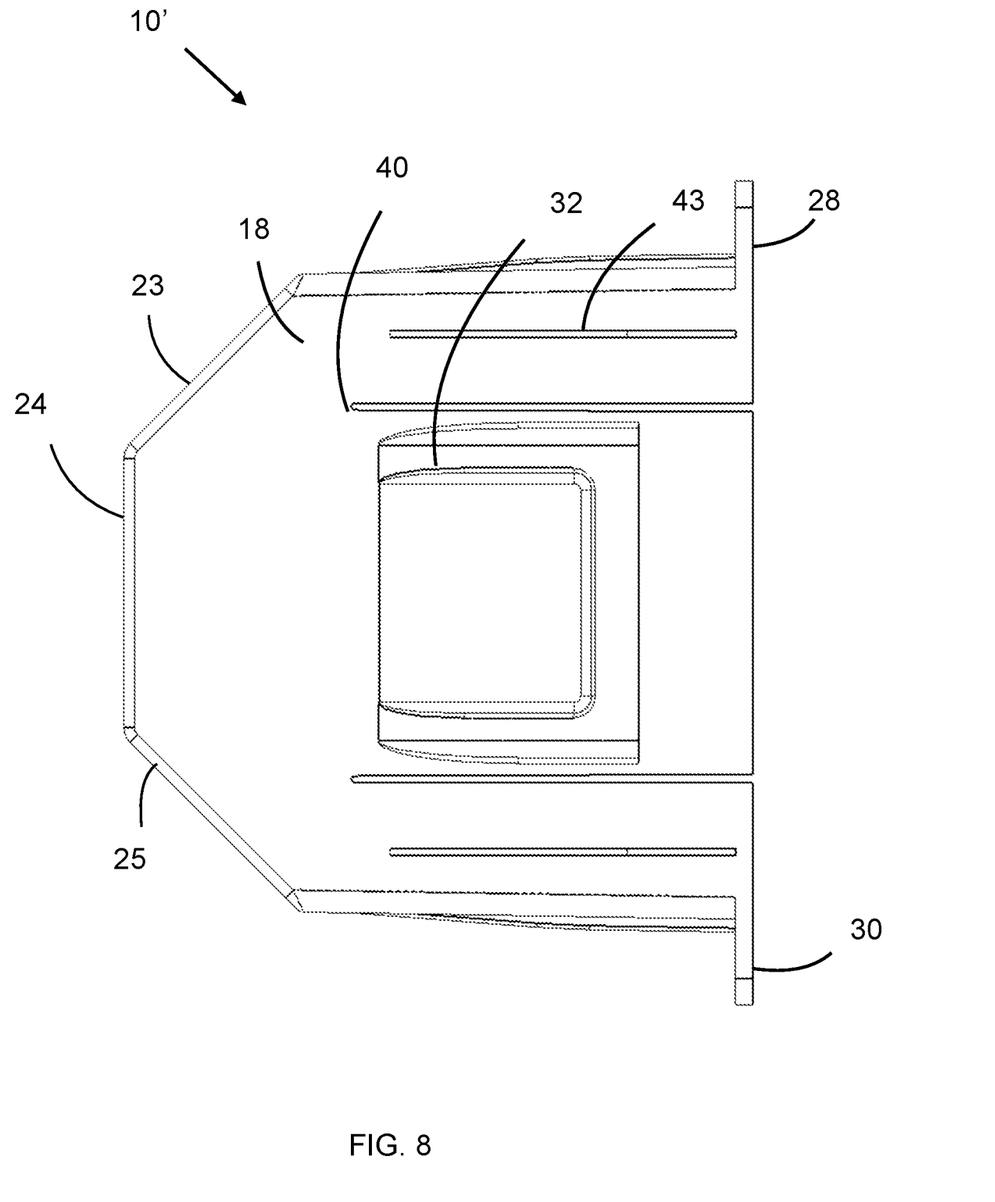
FIG. 8 is a left view (which is a mirror of right side view) showing the wings released to an extended position, with clamping or press fit engagement with a sheet of wall material.
Figure 9:
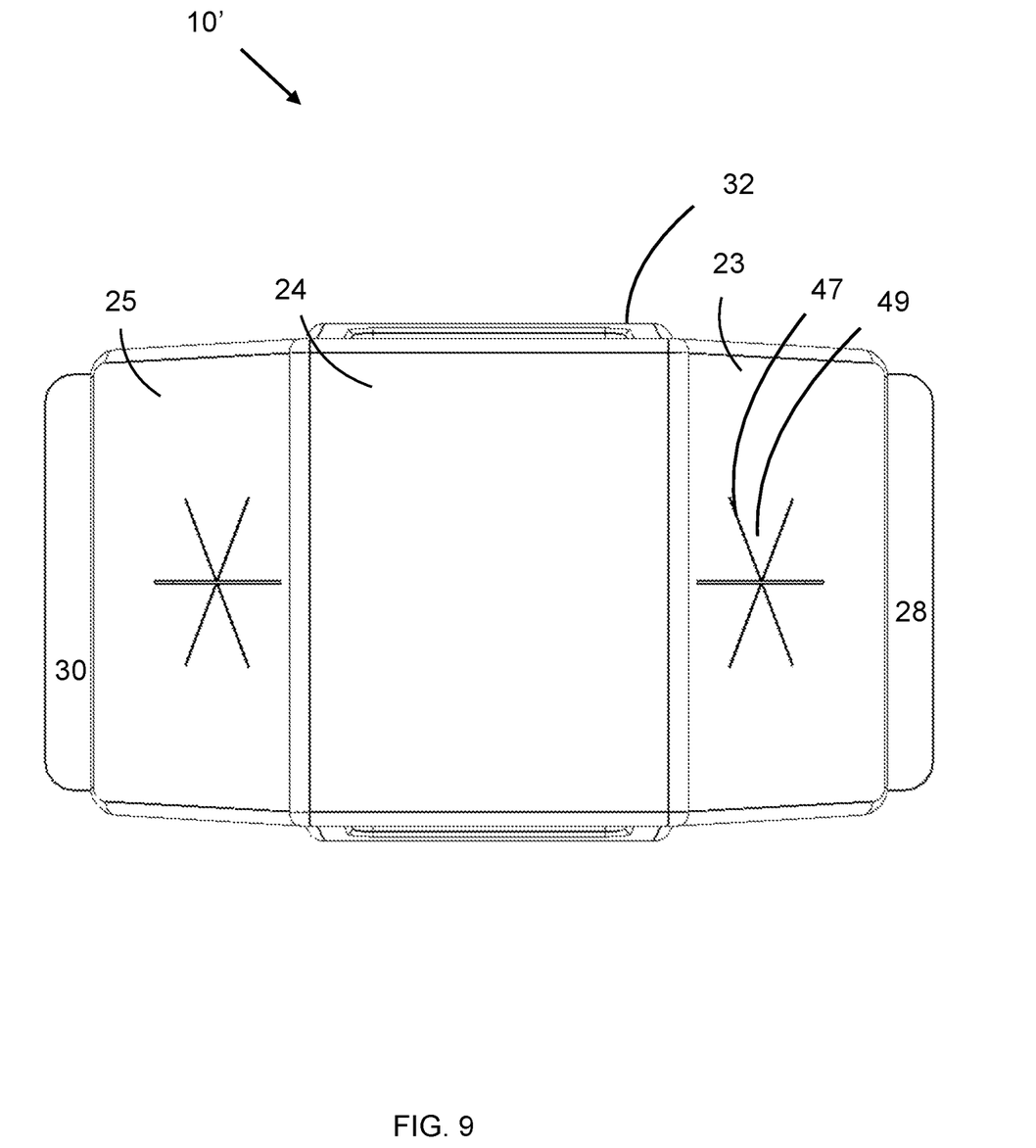
FIG. 9 shows in back side view a junction box of FIG. 5 showing the wings released to an extended position.

Another feature contemplated by the invention is to provide slotted surfaces 52 and 54 in the flanges 28 and 30, respectively. The slotted surfaces 52 and 54 are configured to receive a receptacle cover (not shown) having a complementary slotted surface to retain the same about the junction receptacle reducing the need for screws. Junction receptacle box 10, 10' can be made in any desired geometric shape and a cutout can be similarly formed in a wall or ceiling by first cutting a complementary opening in the exterior wall sheet. The wall opening is made slightly oversized to the wall (18, 20, 22) dimensions of the junction receptacle box 10, 10'. The junction box 10, 10' is installed with wings 32 being compressed to move inwardly as indicated in the arrows in FIG. 2 and FIG. 6. When junction receptacle box 10 is introduced into the wall or ceiling interior by advancing into the wall opening cutout 42 until flanges 28, 30 abut against the outer surface of the dry wall sheet 12 and the wings 32 spring open adjacent the drywall 12 to press fit or clamp the junction box 10 in place.

The press fit mechanism described herein is not limited to application in electrical junction boxes but may be incorporated in a variety of boxes, housings, enclosures and other structures intended for mounting inside walls or ceilings. While a presently preferred embodiment of the invention has been described and illustrated for purposes of clarity and example it must be understood that various changes, modifications and substitutions to the described embodiment will be apparent to those having no more than ordinary skill in the art without departing from the scope of this invention as defined by the following claims.

What is claimed is:

1. A clamping junction receptacle for wall material having a receptacle cut-out surface, which includes:
   a housing having at least one side wall and a back wall defining front opening, at least one flange extending laterally from said at least one side wall adjacent a font edge of said at least one side wall, at least one pivotal wing is formed in said sidewall a part of which having a forward end normally disposed outward from said at least one side wall when in a relaxed position, and a rear end connected to said at least one sidewall by a living hinge which permits said wing to be biased inward and spring back to said relaxed position and wherein said rear end and said forward end are connected by a side wall portion which is pitched to provide a surface against which the receptacle cutout surface can press and cause said side wall portion and said forward end to be biased inward with respect to said at least one side wall and upon passing through the receptacle cut-out surface said forward end and said side wall portion spring back to said relaxed position and wherein said forward end is spaced from the flange about a distance equal to a thickness of the wall material and post insertion said forward end secures said junction box in place with the wall material between said flange and said forward end of said wing.

2. The claiming junction receptacle of claim 1, wherein said side wall portion of said wing includes an inwardly extending pull surface accessed from a front part of said receptacle to gain purchase thereon and draw said wing inward in order to remove the junction receptacle from the wall material.

3. The claiming junction receptacle of claim 1, wherein said flange include at least notch on an inwardly disposed surface thereof.

4. The claiming junction receptacle of claim 1, wherein a front of said receptacle includes at least one screw receiving surface opening in said sidewall for a receiving screw.

5. The claiming junction receptacle of claim 1, wherein one of said at least one sidewall and said back wall includes slit surfaces formed about a retention finger, wherein said retention finger is flexible to receive a wire thereby and has an end which aids to retain the wire from removal once inserted thereby.

6. The claiming junction receptacle of claim 1, wherein said at least one side wall includes a rib.

7. The claiming junction receptacle of claim 1, wherein said at least one side wall is characterized to include two opposing walls each of which include one said wing.

8. The claiming junction receptacle of claim 1, which includes a top wall and a bottom wall interconnecting said back wall and two said side walls.

9. The claiming junction receptacle of claim 8, which includes pitched wall portions interconnecting said, top wall, said bottom wall, said back wall and said side walls.

10. The claiming junction receptacle of claim 9, wherein one of said pitched portions include slit surfaces formed about a retention finger, wherein each said retention finger is flexible to receive a wire thereby and has an end which aids to retain the wire from removal once inserted thereby.

* * * * *